United States Patent [19]

Moon

[11] Patent Number: 5,790,646
[45] Date of Patent: Aug. 4, 1998

[54] REMOTELY ACCESSING SPECIAL SERVICES IN TELEPHONE EXCHANGE

[75] Inventor: Yong-Soon Moon, Euiwang, Rep. of Korea

[73] Assignee: SamSung Electronics Co., Ltd., Kyungki-do, Rep. of Korea

[21] Appl. No.: 679,436

[22] Filed: Jul. 8, 1996

[30] Foreign Application Priority Data

Jul. 6, 1995 [KR] Rep. of Korea ............... 1995-19794

[51] Int. Cl.[6] .................... H04M 3/00; H04M 3/42; H04M 7/00
[52] U.S. Cl. ..................... 379/198; 379/211; 379/231
[58] Field of Search ................. 379/157, 196, 379/197, 198, 201, 207, 210, 211, 212, 231, 232, 233, 188, 199, 200

[56] References Cited

U.S. PATENT DOCUMENTS

| 3,867,582 | 2/1975 | Weed et al. ...................... 379/198 |
| 4,625,079 | 11/1986 | Castro et al. ................. 379/199 X |
| 4,807,279 | 2/1989 | McClure et al. .................. 379/211 |
| 4,893,335 | 1/1990 | Fuller et al. .................. 379/199 X |
| 4,955,047 | 9/1990 | Morganstein et al. .......... 379/198 X |
| 4,956,861 | 9/1990 | Kondo ........................... 379/211 X |
| 5,012,511 | 4/1991 | Hanle et al. ..................... 379/211 |
| 5,289,528 | 2/1994 | Ueno et al. .................... 379/211 X |
| 5,311,572 | 5/1994 | Friedes et al. ................ 379/207 X |
| 5,452,347 | 9/1995 | Iglehart et al. ............... 379/211 X |

*Primary Examiner*—Harry S. Hong
*Attorney, Agent, or Firm*—Robert E. Bushnell, Esq.

[57] ABSTRACT

An incoming call service method and apparatus for an exchange, having a character conversion table and a specific function table, includes: receiving and comparing an extension number and a password of a subscriber upon the generation of a specific office line incoming call; if the extension number and the password are identical to previously stored information, analyzing key data received, based upon the character conversion table and the specific function table; if the received key data is character information, converting the key data into character data to transmit the character data to a corresponding extension subscriber; and if the key data is function information, setting a corresponding function of the corresponding extension subscriber.

12 Claims, 3 Drawing Sheets

REMOTELY ACCESSING SPECIAL SERVICES IN TELEPHONE EXCHANGE

CROSS REFERENCE TO RELATED APPLICATIONS

This application make reference to, incorporates the same herein, and claims all benefits accruing under 35 U.S.C §119 from an application entitled SPECIFIC OFFICE LINE INCOMING CALL SERVICE METHOD OF EXCHANGE earlier filed in the Korean Industrial Property Office on 6 Jul. 1995 and assigned Ser. No. 19794/1995.

BACKGROUND OF THE INVENTION

The present invention relates to a method and apparatus for remotely accessing special services in a telephone exchange, and more particularly to a method and apparatus for executing a specific office line incoming call service.

Along with the development of various functions in communication equipment, there have been required exchanges capable of performing a variety of additional functions as well as existing communication functions. Specifically, the exchange receives and stores a dual tone multi-frequency (hereinafter, referred to as a "DTMF") signal generated from an office line subscriber who is in a remote location, during a communication. One prior art reference exemplary of this technique is disclosed in Korean Laid Open Patent No. 94-8337. In the prior art reference, during a conversation with a caller, a subscriber requests an input of a telephone number of the caller, and when the caller generates the DTMF signal, a DTMF decoder within in the subscriber telephone converts the DTMF signal into digital data. Then, a central processing unit stores the digital-converted telephone information in a memory. It can therefore be appreciated that the telephone is capable of automatically storing the telephone number entered by a caller, during a communication with the counter subscriber.

Another reference exemplary of this technique is disclosed in Korean Laid Open Patent No. 94-8339. In the prior art reference, an automatic telephone answering system stores a telephone number of a calling party during a user's absence. The automatic telephone answering system informs the calling party that a called party has been out and outputs a guide message requiring an input of the telephone number of the calling party. Thus, the telephone number is stored and displayed. When the user returns home and detects the received message, the telephone numbers stored during his absence can be checked.

These systems only store and display some telephone numbers received from external telephone systems, but can not inform the called party of the message which the calling party desires to transmit and can not direct the incoming call to the telephone located at the place where the called party currently.

In the above functions, when the user is located outside and generates an office line outgoing call, the incoming call side receives the call and processes a corresponding function. Upon the incoming call service, there have been presented an office line incoming call service function for specific subscribers. This function is embodied by a DISA (direct inward system access) function. In the DISA function, an exchange automatically answers an office line incoming call to a predetermined telephone number, and has a procedure of checking an identification code, thereby determining the use of the exchange. When the DISA office line incoming call is generated, an exchange recognizes the DISA function and analyzes received data. Then, the exchange provides a call to a corresponding extension subscriber or dials the received telephone number to provide a call to another office line subscriber.

Another additional functions of exchange can be embodied using the DISA function. In other words, a remotely located user can input his or her own information or establish a specific function.

Weed, et al., Morganstein, et al., Ueno, et al. and Iglehart, et al., U.S. Pat. Nos. 3,867,582, 4,955,047, 5,289,528 and 5,452,347, each disclose telephone system in which a remotely located user can access special services in a telephone exchange.

However, none of these references teach or suggest the combination of features provided by the present invention nor are they as simple and efficient in operation as the present invention.

SUMMARY OF THE INVENTION

Therefore, it is an object of the present invention to provide a specific office line incoming call service method and apparatus of an exchange for detecting a specific office line call and analyzing received data to set a corresponding function or store the received data, when a remotely located user generates the specific office line call.

It is another object to provide a specific office line incoming call service method and apparatus for analyzing externally input key data, upon generation of a specific office line call, and for converting the key data into character data to output the character data to a corresponding subscriber's telephone system, in an exchange including a character conversion table and connecting telephones having a display.

It is still another object to provide a specific office line incoming call service method and apparatus of an exchange including the specific function table for detecting externally input data in a specific function table, upon generation of a specific office line call and for setting a function of a corresponding subscriber.

To accomplish these and other objects of the present invention, there is provided an office line incoming call service method and apparatus of an exchange having a character conversion table and a specific function table, contemplating receiving and checking an extension number and a password of a subscriber upon generation of a specific office line incoming call; if the extension number and the password are identical to previously stored information, analyzing received key data, based upon the character conversion table and the specific function table; if the key data is character information, converting the key data into character data to transmit the character data to a corresponding extension subscriber; and if the key data is function information, setting a corresponding function of the corresponding extension subscriber.

BRIEF DESCRIPTION OF THE DRAWINGS ACCOMPANYING

A more complete appreciation of this invention, and many of the attendant advantages thereof, will be readily apparent as the same becomes better understood by reference to the following detailed description when considered in conjunction with the accompanying drawings, in which like reference symbols indicate the same or similar elements components, wherein:

FIG. 1 is a block diagram of an exchange adapted to the present invention; and

FIGS. 2A and 2B together form a flowchart illustrating procedures of storing and processing remote information in an exchange in accordance with the present invention.

DETAILED DESCRIPTION OF THE PREFERRED EMBODIMENT

In the following description, the exchange of the present invention may be a private exchange or a key telephone system, and a telephone of a subscriber may be a telephone having a display. It is assumed that the exchange of the present invention is the key telephone system, and the telephone of subscriber is a key subset.

Figure 1:
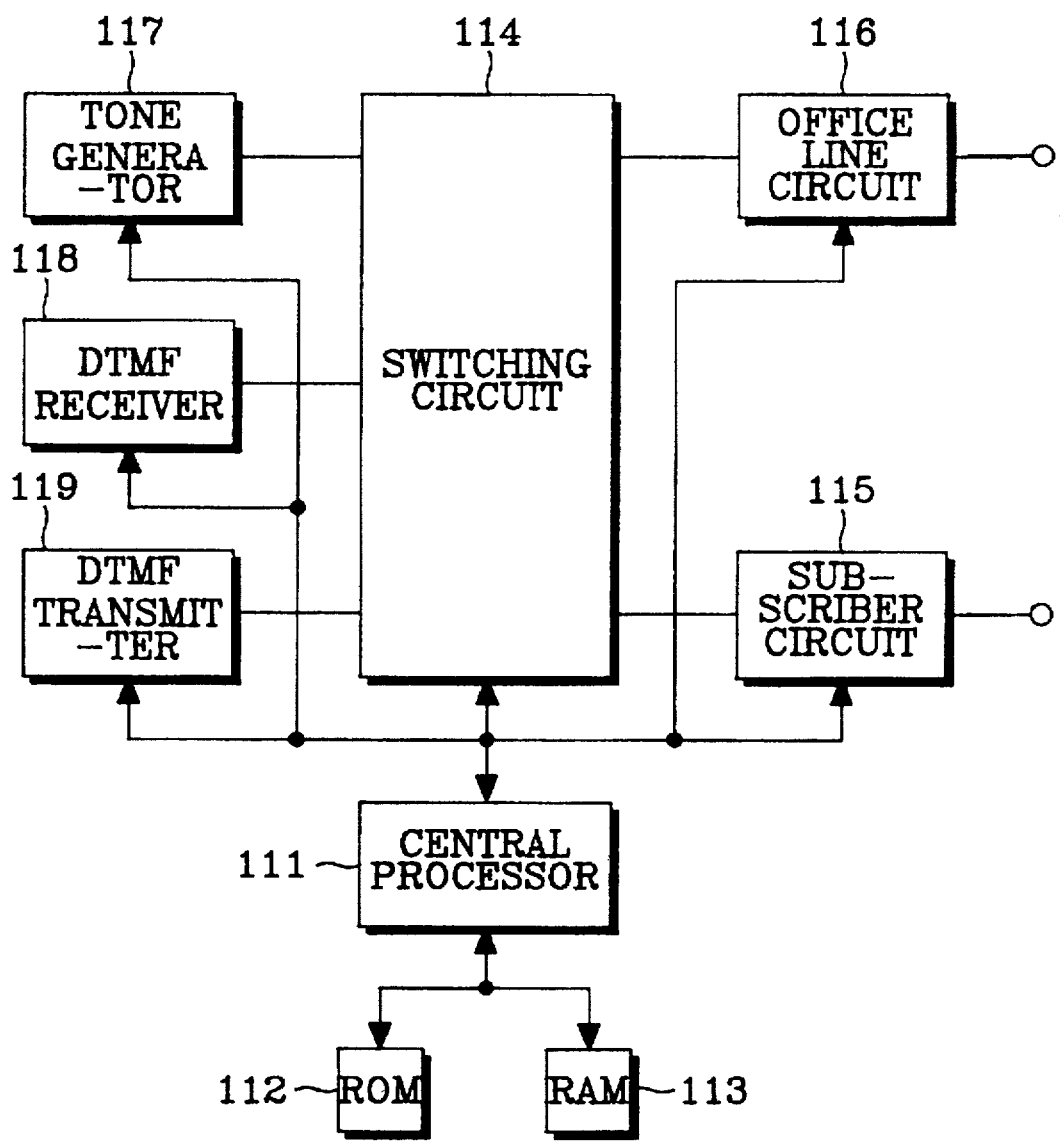
Figure 2A:
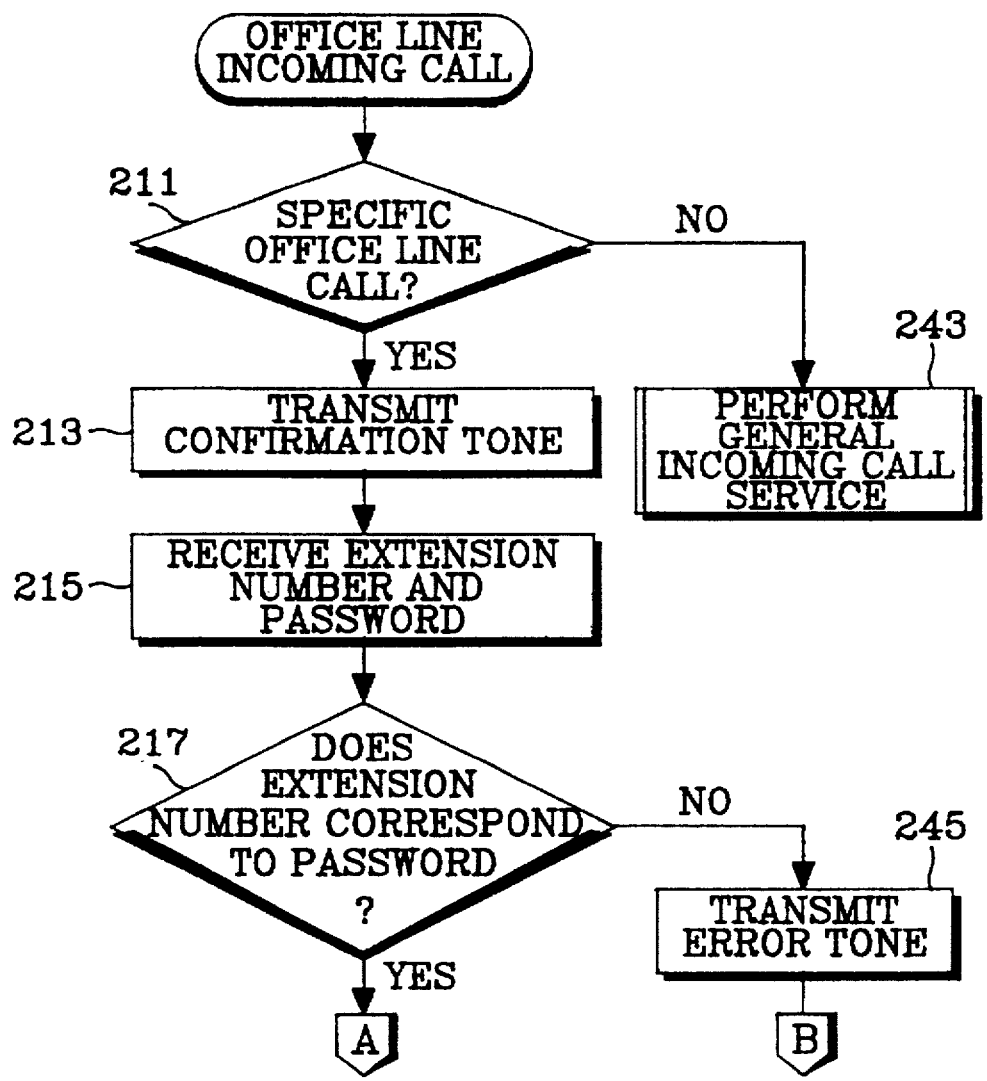
Figure 2B:
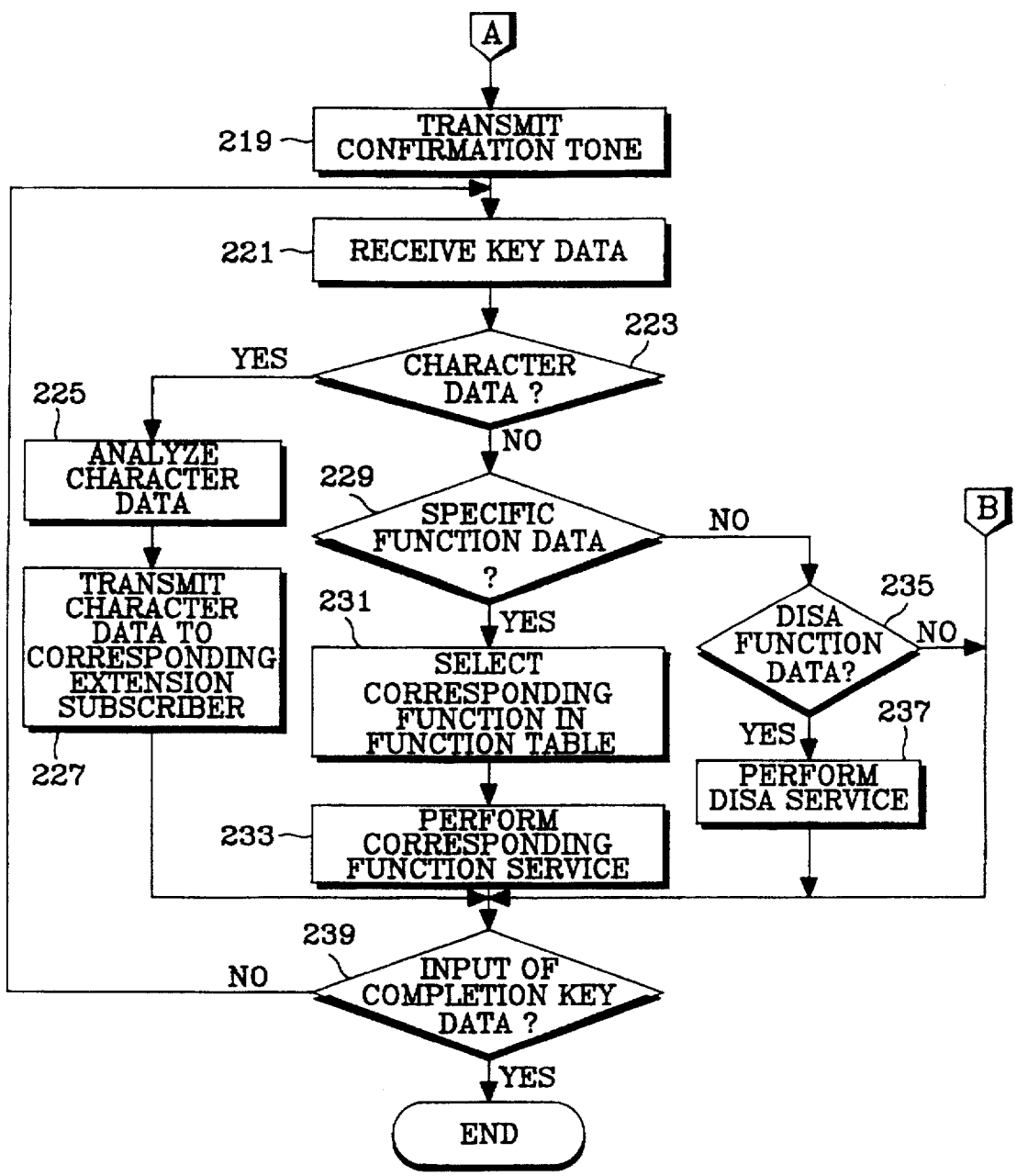

Referring to FIG. 1, a key telephone system applied to the present invention includes a central processor 111, a ROM (read only memory) 112, a RAM (random access memory) 113, a switching circuit 114, a subscriber circuit 115, an office line circuit 116, a tone generator 117, a DTMF (dual tone multi-frequency) receiver 118, and a DTMF transmitter 119. The central processor 111 controls a communication switching and overall operations of the key telephone system to provide all kinds of services to a user. The memory 112 stores a call and program and initial service data of the central processor 111 for performing various functions, at which various tables are provided for detecting the program and key data received as shown in FIGS. 2A-2B. One of them is for converting received key data into character data (hereinafter, referred to as a "character conversion table"), and the other is a function table for storing specific function codes. The RAM 113 temporarily stores the data generated during the prosecution of the program in the central processor 111. The switching circuit 114 switches all kinds of tones and a voice signal under the control of the central processor 111. The subscriber circuit 115 interfaces signals between a subscriber telephone (not shown) and the exchange under control of the central processor 111. In the case of the key telephone system, the subscriber circuit 115 becomes a key phone subscriber circuit, and the subscriber telephone becomes the key subset. Also, the extension represent a line connecting the subscriber circuit 115 and the subscriber telephone. Moreover, in the case of a private exchange, the subscriber telephone becomes a multi-functional telephone having a display and the subscriber circuit 115 has to execute data communication with the multi-functional telephone. The office line circuit 116 seizes an office line, forms an office line speech loop and interfaces the signals between the office line and the exchange, under the control of central processor 111. The office line connects the office line circuit 116 and an office exchange (not shown). The tone generator 117 generates a variety of tone signals to output the tone signals to the switching circuit 114 under the control of central processor 111. The DTMF receiver 118 analyzes a DTMF signal received from the switching circuit 114 and converts the signal into digital data to thereby output the digital data to the central processor 111. The DTMF signal becomes the telephone number which the office line subscriber or the extension subscriber generates. The DTMF transmitter 119 converts the digital data output from the central processor 111 to a DTMF signal and outputs the DTMF signal to the switching circuit 114. The DTMF signal output from the DTMF transmitter 119 becomes the telephone number of the office line subscriber generated when the extension side calls the office line side.

In a preferred embodiment of the present invention, when a specific office line call is generated, an identification code of a calling subscriber is checked and, if the identification code is identical to previously stored information by the calling subscriber, received data is analyzed and the received data is stored or a corresponding function of the data is established. It is assumed that the specific office line call is an office line with the DISA function. The DISA function allows the key telephone to automatically answer a call input by a specific telephone number, and when an identification code of a calling subscriber is checked and identical to the previously stored information in the telephone, allows the use of telephone. Therefore, in the preferred embodiment of the present invention, a remotely located user can store information as to his or her current location with a telephone number or character information, store his/her desired function or try to communicate with the called party using the DISA function. In this case, the key telephone system controls the key subset and displays corresponding information on the display thereof.

The present invention will be described in more detail with reference to FIGS. 2A-2B.

Referring to FIGS. 2A-2B in which a subscriber sets a function using an external office line, when an office line incoming call is first generated, the central processor 111 controls the switching circuit 114 to connect the office line circuit 116 to the DTMF receiver 118, and in step 211 analyzes a telephone number received through the DTMF receiver 118. At this time, when the received telephone number corresponds to a specific telephone number designated in the system, the central processor 111 recognizes the specific office line call and in step 213 controls the tone generator 117 and the switching circuit 114 and transmits a confirmation tone to a corresponding office line side. The specific office line call may be the office line incoming call of the DISA function. When the DISA office line incoming call is generated, the central processor 111 performs an identification code checking procedure of the calling subscriber. The identification code, which is identification information of the corresponding subscriber, is comprised of an extension number and a password. Then, after the confirmation tone is generated, the calling subscriber inputs his or her extension number and password. The extension number and password are received through the office line circuit 116, the switching circuit 114 and the DTMF receiver 118. In step 217, the central processor 111 checks a table where extension numbers of subscribers are stored and a table where passwords of subscribers are stored to detect the received extension number and password. In the preferred embodiment of the present invention, the extension number and password are simultaneously input, but may be separately input. If the received extension number and password have not been provided in the corresponding tables, the central processor 111 in step 245 transmits an error tone through the tone generator 117 and completes a communication procedure.

If, however, the received extension number and password are identical to those previously stored in the system, the central processor 111 in step 219 transmits the confirmation tone through the tone generator 117 and waits for reception of data. At this time, the data to be received is data input by an outside-located calling subscriber. Types of such data are as follows: function data requesting setting of a specific function by the outside-located subscriber in a key telephone system, character data for storing a current location or information of the subscriber, data requesting the DISA function by the subscriber, and so on. The central processor 111 analyzes the received key data to detect whether the data is numeric data or character data.

An input method of the character data is executed by specific keys, such as, for example, an asterisk (*) key and a pound (#) key, on the keypad. It is assumed in the present invention that character data are generated using the asterisk (*) key and numeric keys, as indicated by the following table <1>.

TABLE <1>

| Key Input | Character Data |
|---|---|
| *1 | space |
| *2 | A |
| **2 | B |
| ***2 | C |
| *3 | D |
| **3 | E |
| ***3 | F |
| . | . |
| . | . |
| . | . |

Accordingly, the central processor 111 stores the character conversion table as shown in Table <1> in the ROM 112 and determines the received data as the character data, when the asterisk (*) key data is first input.

Secondly, if the key data is numeric data, the central processor 111 determines the key data as data for performing a specific function or the DISA communication function. In the predetermined embodiment of the present invention, it is assumed that the key data for the specific functions represents numeric data comprised of two-digits and the following function table <2> is provided.

TABLE <2>

| Key Data | Function |
|---|---|
| 61 | external call forwarding code |
| 62 | remote paging code |
| 63 | information message transmitting code during a user's absence |
| . | . |
| . | . |
| . | . |

Further, in the preferred embodiment of the present invention, it is assumed that the key data for performing the DISA communication function represents an extension subscriber number comprised of three-digit. In this case, the key telephone system has an extension subscriber table as shown in the following table <3>.

TABLE <3>

| Key Data | Function |
|---|---|
| 201 | first extension subscriber |
| 202 | second extension subscriber |
| 203 | third extension subscriber |
| . | . |
| . | . |
| . | . |

If the numeric data is input, therefore, the central processor 111 detects whether the numeric data is present in the function table <2> and the extension subscriber table <3> to execute a corresponding service.

When the character and function service operations are completed, the subscriber generates completion key data. In the preferred embodiment of the present invention, the completion key data is used with the pound (#) key.

Referring to FIGS. 2A-2B, if the data reception is effected in step 221, the central processor 111 determines whether the input data is the character data in step 223. In the event that the asterisk (*) key is initially input, the central processor 111 recognizes the input data as the character data and stores the data in the RAM 113 in step 225. Next, the central processor 111 converts the corresponding character information into character code data, based upon the character conversion table <1>. Here, the character code data may be converted into ASCII codes. Then, the central processor 111 in step 227 transmits the converted character code data to the corresponding extension subscriber. The character data input is continued until the pound (#) key used as the input completion key is input. The central processor 111 continuously converts the character data into the character code data and then transmits the converted character code data to the key subset of the corresponding extension subscriber through a data communication system (not shown). The key subset converts the received character code data into a character font and displays the character font in the display. At this time, the character data represents information on the present location of the subscriber or the current state of the subscriber. Therefore, since the subscriber's location or state information is displayed on the extension telephone, any other person can easily know current subscriber information.

If the received data is numeric key data in the step 221, the central processor 111 detects whether the key data for setting the key telephone function in step 229. At this time, when the key data is input for setting the specific function data, the central processor 111 checks in step 231 whether a function code corresponds to the input key data in the function Table <2>. Then, in step 233, the central processor 111 compares the received data to the table of the corresponding subscriber to perform a corresponding function service, and displays the corresponding function set on the corresponding key telephone. Such a function set operation is continued until the pound (#) key is input. The central processor 111 in step the 233 transmits the set function information to the key subset of the corresponding subscriber through the data communication system. Then, the key telephone displays the received function key information, and when the function key set is completed, the central processor 111 sets and performs the corresponding function.

If, for example, the received numeric key data is input with "61" in the step 221, the central processor 111 through the steps 229 and 231 recognizes the key data as an external call forwarding code that is performed when a subscriber forwards an incoming call to the external subscriber. At this time, the subscriber inputs a function key code and a telephone number to be sent. The central processor 111 stores the received telephone number within a table of a corresponding extension subscriber which is assigned in a prescribed area of the RAM 113 and allows the external call forwarding function to be executed. The incoming call to the corresponding extension subscriber is automatically sent to the telephone number stored in the memory 112.

If the numeric key data is input in the step 221, the central processor 111 checks whether key data requesting the DISA communication function is input in step 235. At this time, when the input key data is the DISA communication function requesting data, the central processor 111 performs the DISA function service in step 237. When the received key data is the telephone number of the extension subscriber, the central processor 111 controls the subscriber circuit 115 in the step 237 and informs the corresponding extension subscriber of the incoming call. When the corresponding extension subscriber telephone is in an off-hook state, a speech path is formed and the DISA communication function is performed. On the other hand, when the received key data is the telephone number of an office line subscriber, the central processor 111 controls the switching circuit 114 in the step 237 and connects the DTMF transmitter 119 and the office line circuit 116. The central processor 111 transmits the received telephone number data, and when the office line subscriber responds to the transmitted data, the central processor 111 forms a speech path between the outside calling subscriber and the office line called subscriber, thereby performing the DISA communication function service.

As set forth in the above, there is provided a method and apparatus for detecting a specific office line call and analyzing received data to set a corresponding function or store the received data, when a remotely located user generates the specific office line call in an exchange.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A specific office line incoming call service method of an exchange having both a character conversion table and a specific function table stored in a memory contained therein, said method comprising the steps of:

receiving and checking an extension number and a password of a subscriber upon generation of a specific office line incoming call;

if said extension number and said password are identical to previously stored information, analyzing key data received, based upon said character conversion table and said specific function table;

if said key data is character information, converting said key data into character data to transmit said character data to a corresponding extension of the subscriber; and if said key data is function information, setting a corresponding function of the corresponding extension of the subscriber.

2. The method as claimed in claim 1, wherein said specific office line incoming call is an incoming call with a direct inward system access (DISA) function.

3. A specific office line incoming call service method of an exchange having both a character conversion table and a specific function table stored in a memory contained therein, said method comprising the steps of:

receiving an extension number and a password of a subscriber upon generation of a specific office line incoming call and checking whether said extension number and password are identical to previously stored information;

if said extension number and password are identical to the previously stored information, analyzing received key data;

if said received key data is character information, converting said key data into character data, based upon said character conversion table, to send the character data to a corresponding extension of the subscriber and to display the character data;

if said key data is a function code, checking the function code, based upon said function table, to set a corresponding function of the corresponding extension of the subscriber; and upon a request of a direct inward system access (DISA) communication, providing a call to a subscriber corresponding to a received telephone number to form a speech path.

4. A specific office line incoming call service method of an exchange, said method comprising the steps of:

receiving an extension number and a password of a subscriber upon generation of a specific office line incoming call and checking whether said extension number and password are identical to previously stored information;

if said extension number and password are identical to the previously stored information, analyzing received key data;

if said received key data is an external call forwarding code, storing a received telephone number in a table of a corresponding extension of the subscriber and setting an external call forwarding function, said table being stored in a memory; and automatically sending a call incoming to said corresponding extension of the subscriber to the stored telephone number.

5. A specific office line incoming call service method of an exchange having a character conversion table stored in a memory contained therein where character information generated by combining specific keys and numeric keys is converted into character data, said method comprising the steps of:

receiving an extension number and a password of a subscriber upon generation of an office line incoming call of a DISA function and checking whether said extension number and password are identical to previously stored information;

if said extension number and password are identical to the previously stored information, analyzing received key data;

if said received key data is said character information, converting said key data into said character data, based upon said character conversion table, to transmit said character data to a corresponding extension of the subscriber; and displaying a current position of said subscriber and/or his or her current status information on a display of a subscriber telephone.

6. A specific office line incoming call service method apparatus for an exchange having both a character conversion table and a specific function table stored in a memory contained therein, said apparatus comprising:

a means for receiving and checking an extension number and a password of a subscriber upon the generation of a specific office line incoming call;

analyzing key data received, based upon said character conversion table and said specific function table, if said extension number and said password are identical to previously stored information;

a means for converting said key data into character data to transmit said character data to a corresponding extension of the subscriber, if said key data is character information; and a means for setting a corresponding function of the corresponding extension of the subscriber, if said key data is function information.

7. A specific office line incoming call service apparatus for an exchange having both a character conversion table and a specific function table stored in a memory contained therein, said apparatus comprising:

a means for receiving an extension number and a password of a subscriber upon the generation of a specific office line incoming call and for checking whether said extension number and password are identical to previously stored information;

a means for analyzing received key data if said extension number and password are identical to the previously stored information;

a means for converting said key data into character data, based upon said character conversion table, and for sending the character data to a corresponding extension of the subscriber and for displaying the character data if said received key data is character information;

a means for checking the function code, based upon said function table, to set a corresponding function of the corresponding extension of the subscriber if said key data is a function code; and a means for providing a call to a subscriber corresponding to a received telephone number to form a speech path upon a request of a direct inward system access (DISA) communication.

8. A specific office line incoming call service apparatus for an exchange, said apparatus comprising:

a means for receiving an extension number and a password of a subscriber upon generation of a specific office line incoming call and for checking whether said extension number and password are identical to previously stored information;

a means for analyzing received key data if said extension number and password are identical to the previously stored information;

storing a received telephone number in a table of a corresponding extension of the subscriber and setting an external call forwarding function if said received key data is an external call forwarding code, said table being stored in a memory; and a means for automatically sending a call incoming to said corresponding extension of the subscriber to the stored telephone number.

9. A specific office line incoming call service apparatus for of an exchange having a character conversion table, stored in a memory, where character information generated by combining specific keys and numeric keys is converted into character data, said apparatus comprising:

a means for receiving an extension number and a password of a subscriber upon generation of an office line incoming call of a DISA function and for checking whether said extension number and password are identical to previously stored information;

a means for analyzing received key data if said extension number and password are identical to the previously stored information.;

a means for converting said key data into said character data, based upon said character conversion table, and for transmitting said character data to a corresponding extension of the subscriber if said received key data is said character information; and a means for displaying a current position of said subscriber and/or his or her current status information on a display of a subscriber telephone.

10. The method as claimed in claim 4, wherein said specific office line incoming call is an incoming call with a direct inward system access (DISA) function.

11. The method as claimed in claim 6, wherein said specific office line incoming call is an incoming call with a direct inward system access (DISA) function.

12. The method as claimed in claim 8, wherein said specific office line incoming call is an incoming call with a direct inward system access (DISA) function.

* * * * *